United States Patent [19]
McMackin, Jr.

[11] Patent Number: 5,167,319
[45] Date of Patent: Dec. 1, 1992

[54] DIRECTION CHANGING CONVEYOR

[76] Inventor: Paul J. McMackin, Jr., 45 Roger Goodwin Dr., Wrentham, Mass. 02093

[21] Appl. No.: 748,154

[22] Filed: Aug. 21, 1991

[51] Int. Cl.⁵ .......................................... B65G 47/74
[52] U.S. Cl. ............................................... 198/599
[58] Field of Search ............... 198/457, 637, 599, 434, 198/447

[56] References Cited

U.S. PATENT DOCUMENTS

| | | | |
|---|---|---|---|
| 1,109,284 | 9/1914 | Friel | 198/457 |
| 1,574,914 | 3/1926 | McNamara | 198/457 |
| 2,425,158 | 8/1947 | Masich | 198/599 |
| 3,038,584 | 6/1962 | Lassdin | 198/599 |
| 3,253,696 | 5/1966 | Szatkowski et al. | 198/599 X |
| 3,253,698 | 5/1966 | Murphy | 198/637 |
| 3,363,741 | 1/1968 | Dierksheide | 198/457 X |
| 3,604,551 | 9/1971 | Fink | 198/448 |
| 3,643,781 | 2/1972 | Risley et al. | 198/599 |
| 3,831,733 | 8/1974 | Howard et al. | 198/447 |
| 4,054,199 | 10/1977 | Polderman | 198/452 |
| 4,142,636 | 3/1979 | Planke | 198/599 X |
| 4,281,759 | 8/1981 | Pentith | 198/725 X |
| 4,567,978 | 12/1986 | Hartness | 198/454 X |
| 4,619,358 | 10/1986 | May et al. | 198/457 |
| 4,976,343 | 12/1990 | Fuller | 198/453 |

OTHER PUBLICATIONS

Catalog page 9.
Catalog page 16.
Krones Manual of labelling Technology, Dullinger, Dec. 1978.

Primary Examiner—Robert P. Olszewski
Assistant Examiner—James R. Bidwell
Attorney, Agent, or Firm—Hamilton, Brook, Smith & Reynolds

[57] ABSTRACT

A conveyor having [means for changing direction of conveyed articles in which there is] an input chain 20, output chain 24 at an angle with the input chain, inner and outer guide rails 30 and 44 and one or more supplemental discharge chains 50, 54 and 56 to assist in moving conveyed articles from the input chain to the output chain.

17 Claims, 8 Drawing Sheets

INFEED CHAIN DIRECTION

DIRECTION CHANGING CONVEYOR

FIELD OF THE INVENTION

The invention relates to conveyors in general and, more particularly, to conveyors having means for changing direction of conveyed articles while maintaining the articles in upright position without excessive tumbling or tipping.

BACKGROUND OF THE INVENTION

Virtually every modern plant or factory has one form or another of article conveying means which are substantially automatic and independent of operator control. Conveyors may be overhead carriers, pneumatic tubes, horizontal rollers, chairs or belts. The simplest conveyors were, and are, one piece, sewn, continuous leather or fabric belts. The present invention, however, relates to conveyors having flat, horizontal, narrow plates or links, hinged, one behind another and which are driven over pulleys. Being linked to one another, the conveyors, themselves, are frequently referred to as "chains" and will hereinafter be so called.

There are essentially two types of flat, horizontal, articulated conveyor chains in use today. One conveyor is straight running, where the entire conveyor belt or chain is pulled in one straight line, over a pulley which is a drive sprocket, and then drawn back in a straight line to the starting point, which is an idler sprocket. Drive sprockets are arranged to pull the linked plates, as distinguished from pushing them. This type of chain will convey articles only in a linear path.

Two straight running conveyors running essentially at right angles to each other is called a butt turn.

A second type of articulated link conveyor is the side flexing chain, or, as it is also called, "flex chain". Each thin flat plate is not only articulated by being hinged to the adjacent plates, but is capable of pivoting or side-flexing relative to the straight path, such that the chain itself can go around a curve. Of necessity, the curves have large radii and require more space to make a right angle turn than two straight running conveyors arranged at right angles to each other. The flex chain needs a greater degree of maintenance and requires the use of lubricant because of the friction between the chain and wear strips which support it as well as the friction between the upper or supportive surface of each chain plate and the articles carried on them. In the flex chain system, the links are subject to arcing or pivotal motion relative to one another as the flex chain goes around a curve.

Flex chains are more expensive, heavier, and have additional bulk on their bottom or non-article supporting surfaces to follow in a track in the conveyor frame. On the positive side, flex chains produce a smoother "ride" for articles conveyed at relatively high speed. One reason for this is that they go around large radius curves.

The article engaging surfaces of both straight running and side flexing chains are generally thermoplastic material hinged with stainless steel pins. Many are nominally 7½ inches wide.

The present invention relates to single file chains which produce a butt turn or a dead turn, wherein two separate conveyor chains are arranged essentially at right angles to one another. Articles may be conveyed by such chains either single file or in mass flow where there are a number of conveyed articles abreast of one another. Because articles are constantly pivoting and rotating on the upper or support surfaces of the flex chain plates, large quantities of conveyor lubricant is needed. Not only is the lubricant potentially a contaminant to any food or beverage which is being placed in the article being conveyed such as bottles or cans, but the cost of disposing of effluence associated with spent conveyor lubricant is ever increasing.

One of the requirements for successful material handling is to maintain stability of conveyed articles to a very high degree. Instability is generally a function of the size and relative weight of the articles being conveyed. For example, large rectangular cartons packed with filled cans rarely tip over unless there is a complete conveyor breakdown. However, articles such as unfilled plastic bottles with high centers of gravity and low weight per volume ratios are quite susceptible to tipping. Even the bottles, when filled, being relatively tall in proportion to their bases can tip and spill their contents.

On a straight running conveyor, stability of an article is influenced by the articles contact with the chain, contact with the guide rails, and contact with other containers. While moving in a straight path, there is little contact with the guide rails. Consequently, there is little influence on their velocity which remains substantially constant. Anything that contacts an article, as by friction, influences its velocity and consequently reduces its stability. Contact with guide rails when making a turn is unavoidable. However, since most turns are made with articles such as bottles moving in single file, as for example, with a single infeed chain and a single discharge chain, when the articles are not being conveyed single file, they invariably touch one another which reduces stability.

New developments in materials for conveyor chains have been aimed at lowering friction and ultimately running without conveyor lubricant. This is obviously a benefit because of the ever increasing cost of effluent discharge associated with used conveyor lubricant and other waste lubricants. However, chains being manufactured with new materials, for the most part, are of the straight running type and not flex chain. This means that turns must be accomplished by the older method of butt turns rather than flex turns.

In the conventional butt turn, when a article, such as a container, enters a turn, it contacts a guide rail, generally curvilinear, but not necessarily so. It consequently decelerates in the direction of movement of the infeed chain, but is displaced by the guide rail at an angle generally-approaching that of the discharge chain, which, for the most part, is oriented at right angles to the infeed chain. As the article continues through the curve, it continues to decelerate in the direction of the infeed and to pick up an ever increasing component of movement toward the discharge chain.

As an article being conveyed nears completion of the turn, velocity in the infeed direction approaches zero. However, the velocity in the direction of the discharge chain also approaches zero because it is still on the infeed chain. As an article, such as a bottle or other container, reaches the end of its contact with the guide rail, the guide rail in effect becomes a barrier or tangent to any further motion in the infeed direction while the infeed chain drags across the bottom of the then almost stationary container. The deceleration or change in velocity contributes to its instability.

It is to these problems that the present invention is directed.

SUMMARY OF THE INVENTION

The invention is embodied in a conveyor which has means for changing direction of conveyed article and includes an infeed chain and a discharge chain. The infeed chain extends transversely of the width of the discharge chain. It intersects the discharge chain at the apex of a reentrant angle which is defined by the corresponding sides of each chain measured in the direction of feed. A guide rail extends from a point on the infeed chain which is upstream from the apex to a point on the discharge chain which is downstream from the apex. The articles are engagable with the guide rail as they move from the infeed chain to the discharge chain.

The invention additionally includes at least one supplemental discharge chain which is located adjacent the primary discharge chain and which is movable parallel to and in the direction to the discharge chain. The supplemental chain engages and imparts lateral motion to articles before they reach the discharge chain.

As another feature of the invention the conveyors include both an interior and an exterior guide rail each of which extend from the point on the infeed chain which is upstream of the apex and extend to a point on the discharge chain which is downstream from the apex. These guide rails create a guide path located above at least a portion of the reentrant angle.

The guide rail or guide rails if more than one are employed, may either be curvilinear or linear.

Depending upon how far upstream and how far downstream the guide rails begin and end, more than one supplemental discharge chain may be employed to impart motion in the direction of the discharge chain. When there are more than one supplemental discharge chain, the articles move successively from one to another in the infeed direction, ultimately being positioned on the primary discharge chain.

The above and other features of the invention including various novel details of construction and combinations of parts will now be more particularly described with reference to the accompanying drawings and pointed out in the claims. It will be understood that the particular conveyor embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
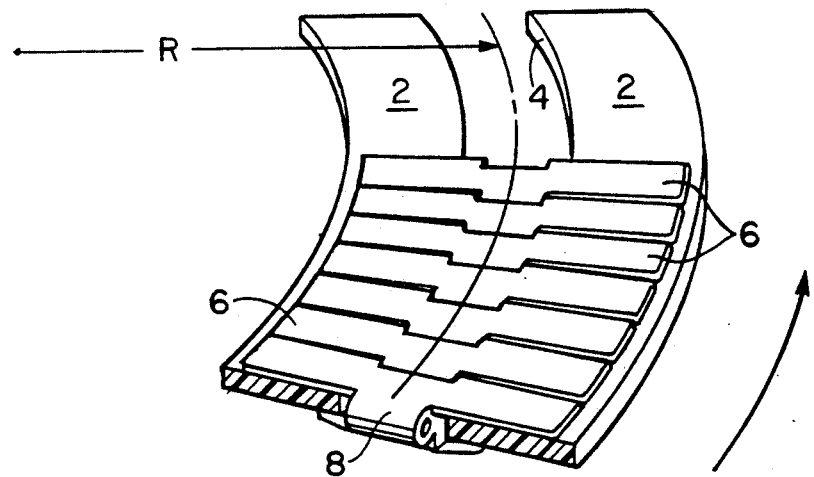
FIG. 1 is a perspective view of part of a state-of-the-art flex chain conveyor.
Figure 2:
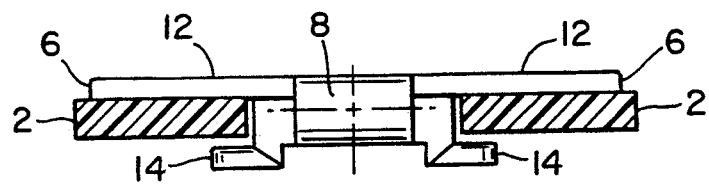
FIG. 2 is a view of the flex chain conveyor of FIG. 1 partially in section and, on enlarged scale, viewed in the direction of travel.
Figure 3:
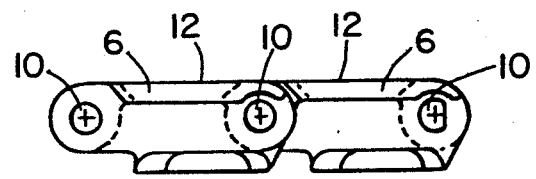
FIG. 3 is a side view of two articulated links of the flex chain conveyor of FIG. 1.

Portions of a state-of-the-art flex chain conveyor are illustrated in FIGS. 1–3. The conveyor comprises a conveyor frame in the form of split track portions 2, having a slot 4 disposed between them. A series of links 6 are arranged to ride on the upper surface of the conveyor track portion 2 and are hinged, one to another, by female hinge members 8 and hinge pins 10 (FIG. 3). The upper flat faces 12 of the links 6 form a movable continuous conveyor surface.

As seen in FIG. 2, extending downwardly and outwardly from the blank 8, are feet 14 which are engagable beneath the plates 2 of the carrier frame. There is sufficient space between the feet 14, the frame member 2 and the female hinge members 8 to permit the chain to follow the curved track 4 around a radius R. but lubricant must constantly be supplied due to the frictional engagment of these parts. The lower portion of each link of the chain is engagable with a driving sprocket, not shown, and, at the end of its run, passes over and around an idler sprocket, thence to be returned in continuous fashion.

Figure 4:
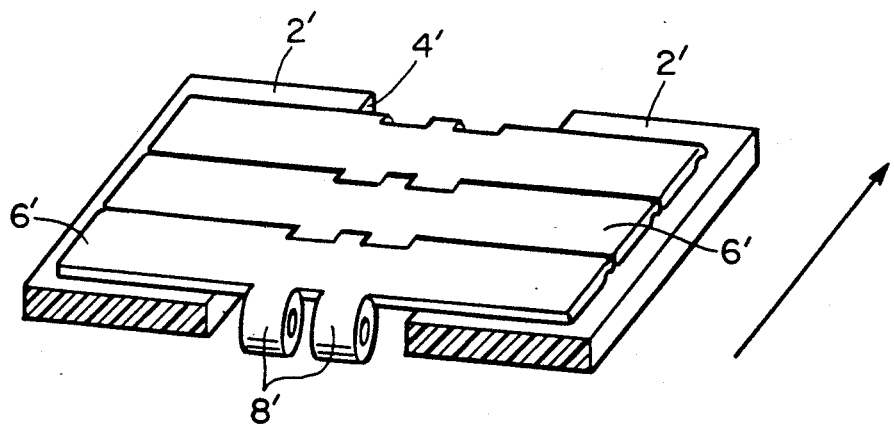
FIG. 4 is a perspective view of a state-of-the-art straight chain conveyor.
Figure 5:
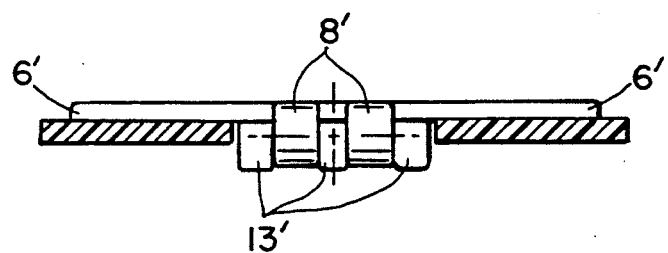
FIG. 5 is a view of the straight chain conveyor of FIG. 4 partially in section and viewed in the direction of travel.
Figure 6:
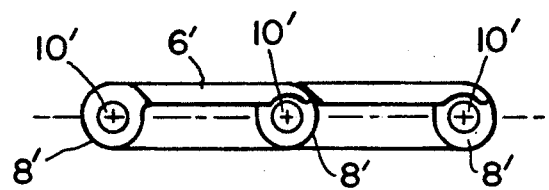
FIG. 6 is a side view of two articulated links of the straight chain conveyor of FIG. 4.

FIGS. 4–6 illustrate a state-of-the-art straight chain conveyor which is similar in many respects to the flex chain. It includes tracks 2' forming part of the conveyor frame and links 6'. Each link has a female split-hinge member 8' cooperating with additional female hinge portions 13' and pins 10' to secure adjacent links together as with the flex chain.

The principle difference between the flex chain and the straight link being that the track slot 4' of a straight link conveyor is straight, there is no need for feet extending beneath the plates 2' of the conveyor frame and less lubricant is needed.

Figure 7:
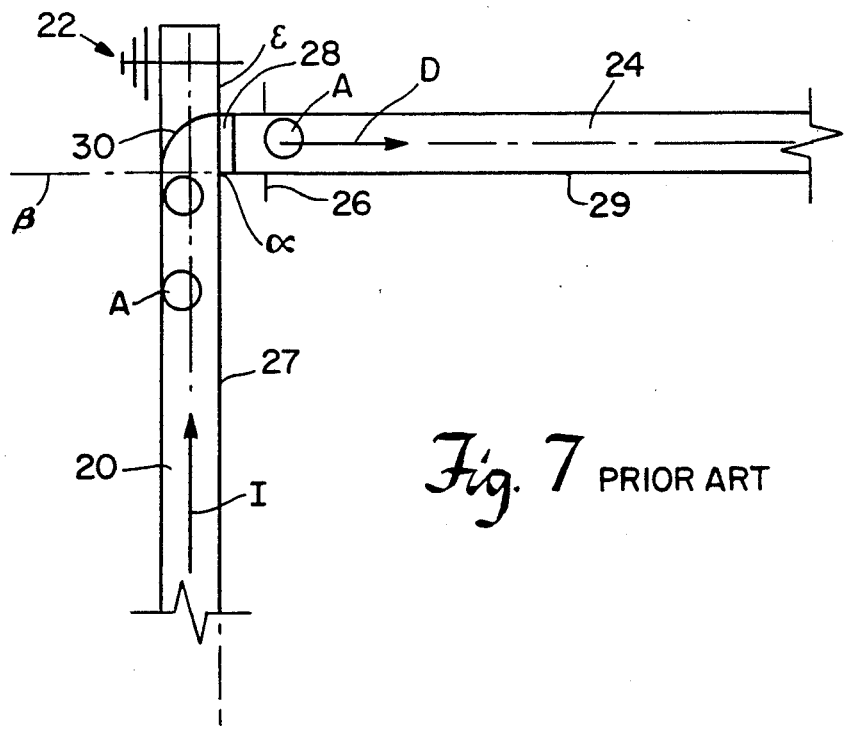
FIG. 7 is a schematic plan view of a prior art straight line conveyor system arranged to produce a butt turn for conveying articles in single file.

FIG. 7 is a schematic plan view of a conventional prior art straight chain conveyor arranged to produce a butt turn. The conveyor system includes an infeed chain 20 with its links (not shown) traveling in the direction of the arrow I. The infeed chain is driven by a driving sprocket 22 and which is shown only schematically. The chain goes over the sprocket down and back to an idler sprocket at the beginning of the chain 20 but is not shown in FIG. 7. A discharge chain 24 is arranged at right angles to the infeed chain 20 and moves in the direction of the arrow D. It passes around an idler sprocket which is rotatable about an axis 26 and is pulled by a driving sprocket located to the right of FIG.

7 but not shown in the figure. Articles A are conveyed by the conveyor system.

Because the axis 26 of the idler wheel is to the right of the input chain 20, a "V" shaped gap is created in their upper surface. To fill the gap immediately adjacent the right hand or inner side 27 of the input chain 20 (measured in the direction of feed), there is a conventional stationary dead plate 28 over which the articles must pass as they move from the input to the discharge chain. Assisting in the transfer is a guide rail 30.

The infeed chain 20 extends transversely of the width of the discharge chain 24 and intersects discharge chain at the apex $\alpha$ of a reentrant angle defined by the corresponding sides of each chain measured in the direction of feed, the sides being 27 and 29. The above description is illustrative of a prior art butt turn of a conveyor designed for articles A moving in single file.

Figure 8:
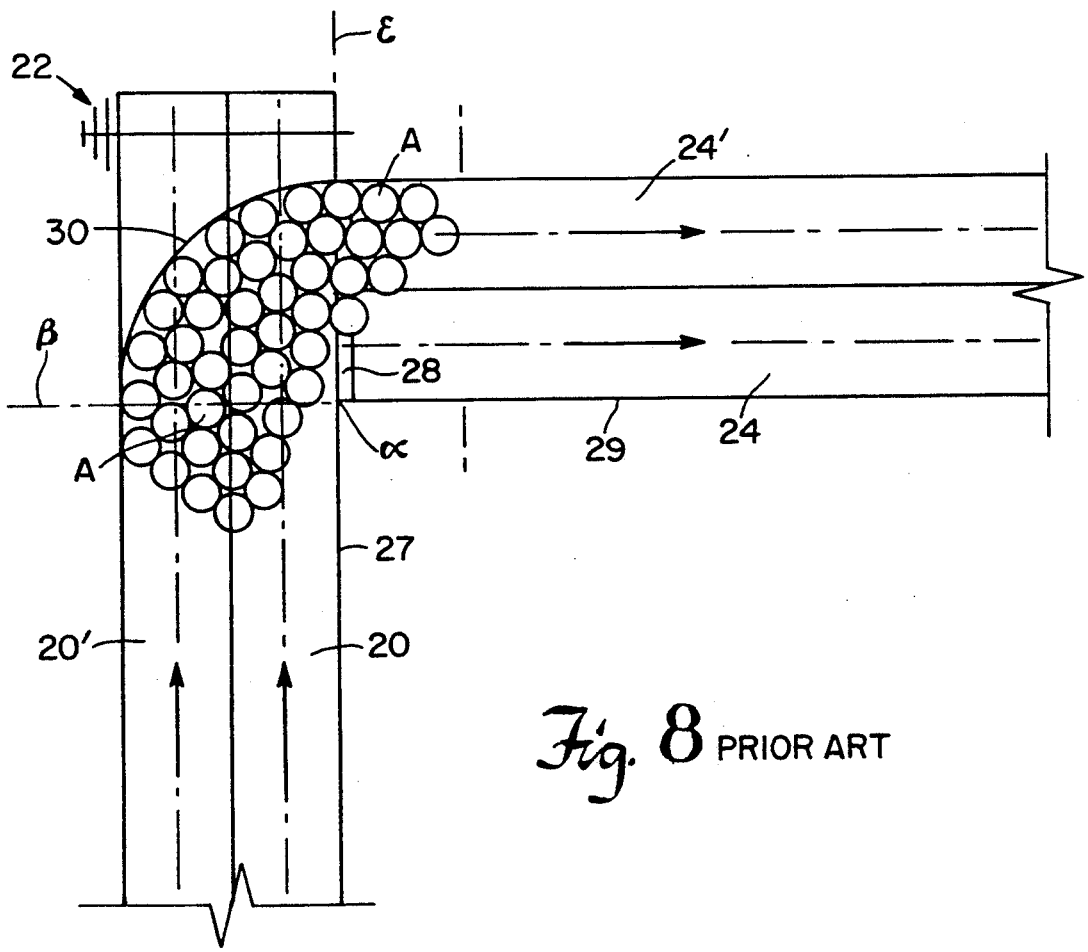
FIG. 8 is a view similar to FIG. 7 of a prior art conveyor having double parallel infeed and discharge chains for conveying articles arranged side by side.

FIG. 8 is identical to FIG. 7 except that it includes two parallel cooperating infeed chains 20 and 20' and two discharge chains 24 and 24' arranged to convey articles arranged randomly but side by side.

In both the FIG. 7 and FIG. 8 configurations, the guide rail 30 begins at a point which is neither upstream or downstream of a line $\beta$ which is an extension of the side 29 of the discharge chain which passes through the apex $\alpha$ and defines one side of the reentrant angle and it terminates on a line $\epsilon$ (epsilon) which is an extension of the side 27 of the reentrant angle and which also passes through the apex angle $\alpha$.

Figure 14:
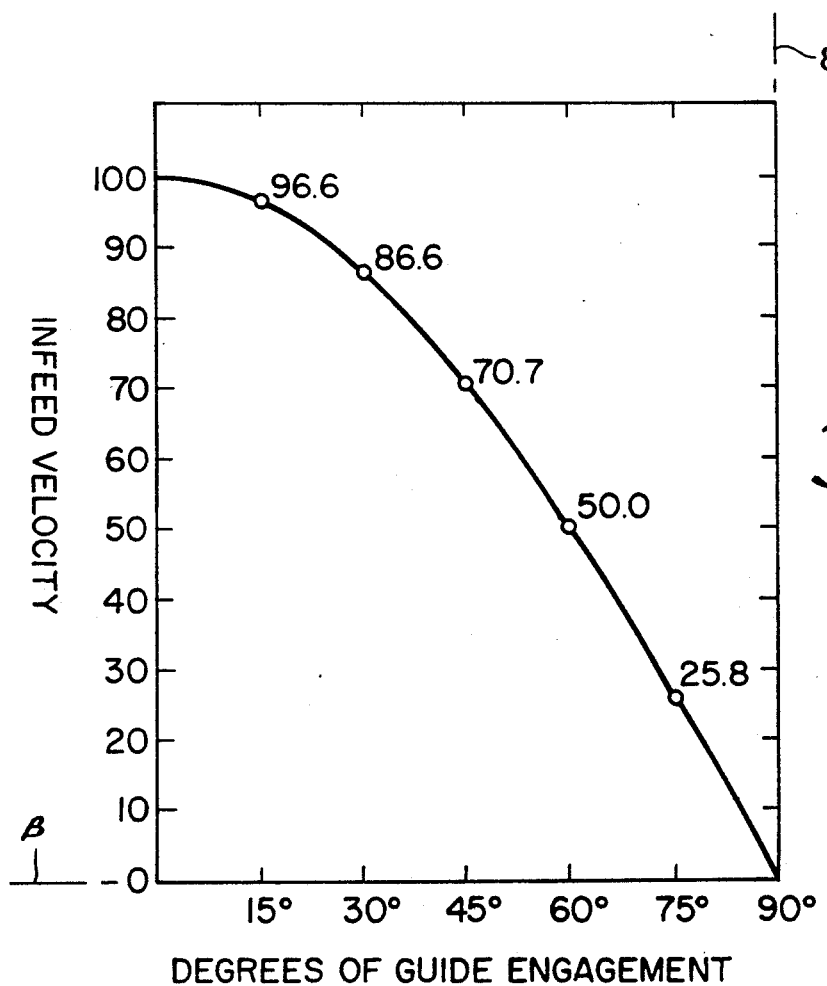
FIG. 14 is a graph of article deceleration as it goes around a turn in engagement with a 90° guide rail.
Figure 15:
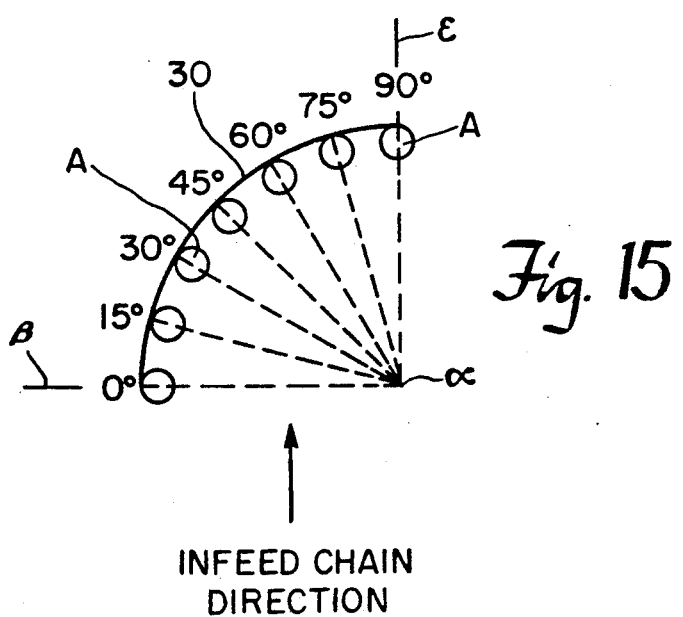
FIG. 15 is a graph of article position relative to a 90° guide rail with the degree of guide engagement corresponding to that of FIG. 14.

Referring next to FIGS. 14 and 15, the velocity of a conveyed article A as it engages the guide rail 30 will be describe. In FIG. 15, an article A engages the guide rail 30 at the line $\beta$ and proceeds around the guide rail (shown increments of 15°) until it reaches the line $\epsilon$ whereupon it has gone through a 90° arc. Comparing FIG. 15 with FIG. 14, as the article first reaches the line $\beta$, it has 100% of its velocity in the infeed direction. When it goes 15° around the apex $\beta$ in engagement with the guide rail 30 it has only 96.6% of its velocity in the infeed direction. At 60° its velocity is 50% and when it reaches the line $\epsilon$ and loses contact with the guide rail it has 0° velocity in the infeed direction.

At this point in time the article or articles have reached the dead plate 28 and there is no velocity or force component urging it in the direction of the discharge chain 24. The only way an article A in single file or articles A abreast can move onto the discharge chain is by being pushed by a following article. This induces tipping of the article particularly when it is light in weight and has a high center of gravity such as with an unfilled plastic beverage bottle.

Figure 9:
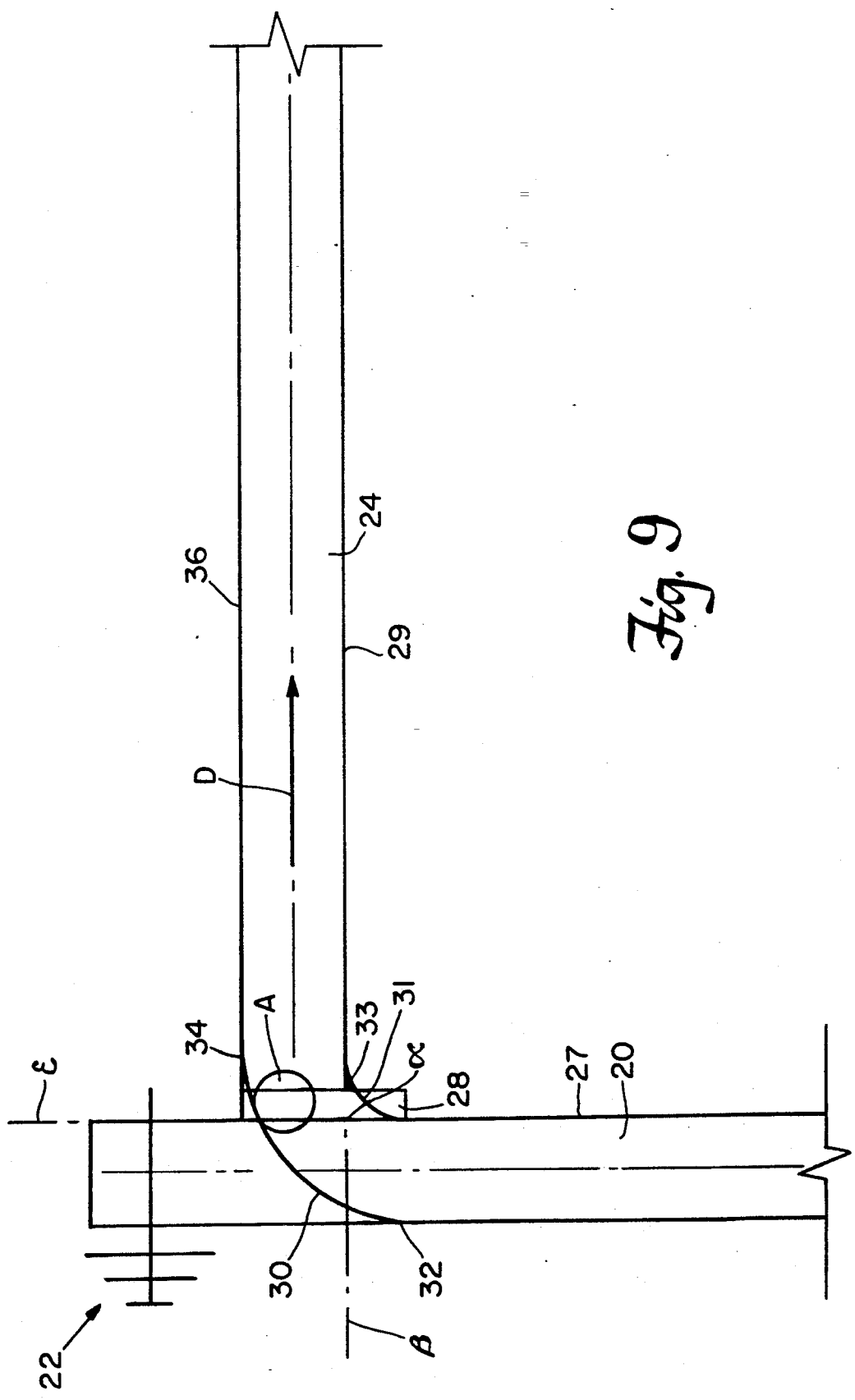
FIG. 9 is a schematic plan view of a straight line conveyor system arranged to produce a butt turn and embodying features of the present invention.

Referring next to FIG. 9, means for retaining the velocity of conveyed articles A until they reach the discharge chain will be described. The guide rail 30 instead of starting at the line $\beta$ which intersects the apex $\alpha$ of the reentrant angle, begins upstream at a point 32 and terminates at a point 34 on the outer edge 36 of the discharge chain which is downstream of the line $\epsilon$ which passes through the apex $\alpha$.

As the result of earlier upstream engagment with the guide rail 30 and later downstream disengagement, the article A still has a velocity component while it is on the dead plate 28, which means that it comes into engagment with the moving discharge chain 24 while it still has a velocity component induced by the input chain 20 and the guide rail 30. An inner guide rail 31 is required along with a dead fillet 33 to keep articles from falling from the chains 20 and 24.

Another embodiment of the invention will be described with reference to FIG. 10. The guide rail 30 in this instance begins at a point 38 which is further upstream from the line $\beta$ or the apex $\alpha$ and terminates at a point 40 which is still further downstream of the line $\epsilon$. In this instance, as an article reaches a point on the guide rail 30 where it crosses the line B, it has considerably more lateral or discharge direction velocity than in the FIG. 9 embodiment and easily crosses the dead plate 28.

As in the FIG. 9 embodiment, a substantially triangular area 41 (shown stipled) is exposed. There is no dead plate to support the article and there is no portion of the discharge conveyor 24 to engage the article and no fillet in the area 41 to support it. This void would cause the article A being conveyed to either fall through the conveyor or be knocked over.

In this instance, a inner guide rail 31 is located which also starts substantially upstream of the line $\beta$ at a point directly across the input conveyor 20 from the point 38 and which also terminates at the discharge conveyor at a point directly across from the point 40.

A supplemental discharge chain 50 is located adjacent the primary discharge chain 24 and horizontally aligned with it. It is movable parallel to and in the direction of the discharge chain D along the arrow $D_s$ to engage and impart motion to articles before they reach the primary discharge chain 24. This effectively eliminates the triangular shaped void 41.

The supplemental chain 50 is readily driven from jack shafts deriving their power from the discharge chain idler sprocket 26 (not shown) for a sprocket 51 through a belt chain drive 53 through a sprocket 55 to a drive sprocket beneath the chain 50 (not shown).

In this embodiment, as an article A reaches an early stage of engagement with the guide rail 30 and is still receiving a substantial lateral velocity component it crosses the dead plate 28, and is engaged by the moving supplemental conveyor 50. Thus, it is effectively carried, without appreciable interference or interruption onto the discharge conveyor 24.

Figure 11:
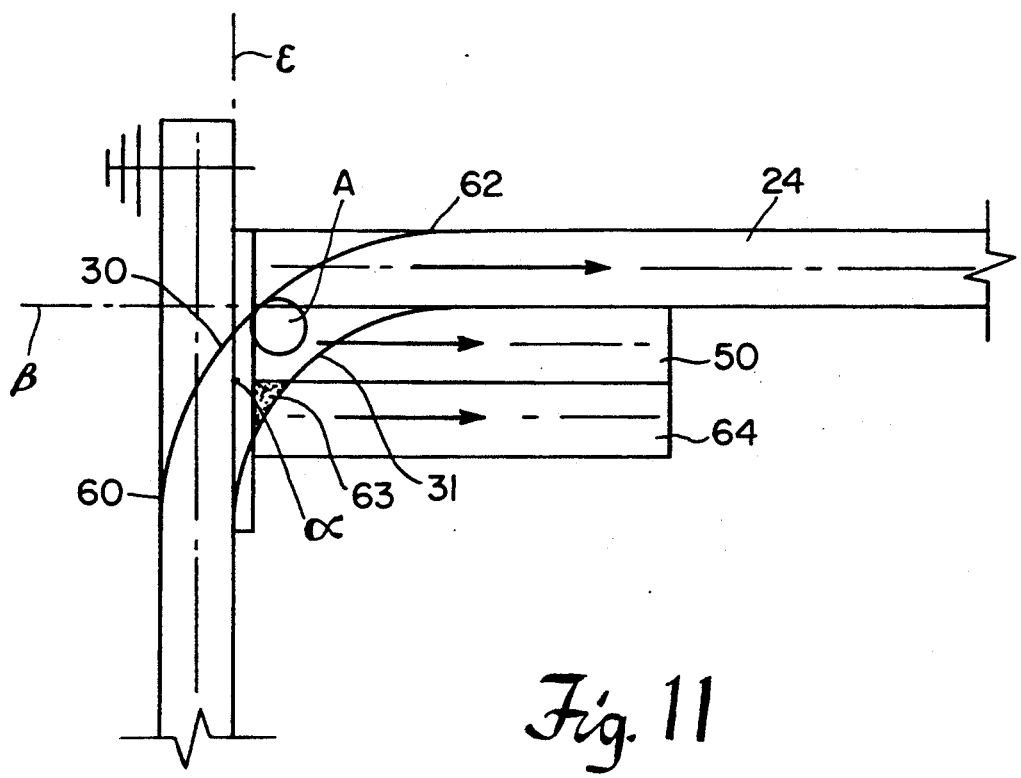
FIG. 11 is a view similar to FIG. 9 illustrating a third embodiment of the invention.

Next referring to FIG. 11, the outer guide rail 30 and the inner guide rail 31 may start even further upstream on the input chain 20 and terminate even further downstream on the discharge conveyor 24 at points 60 and 62, respectively than in previous embodiments.

Figure 10:
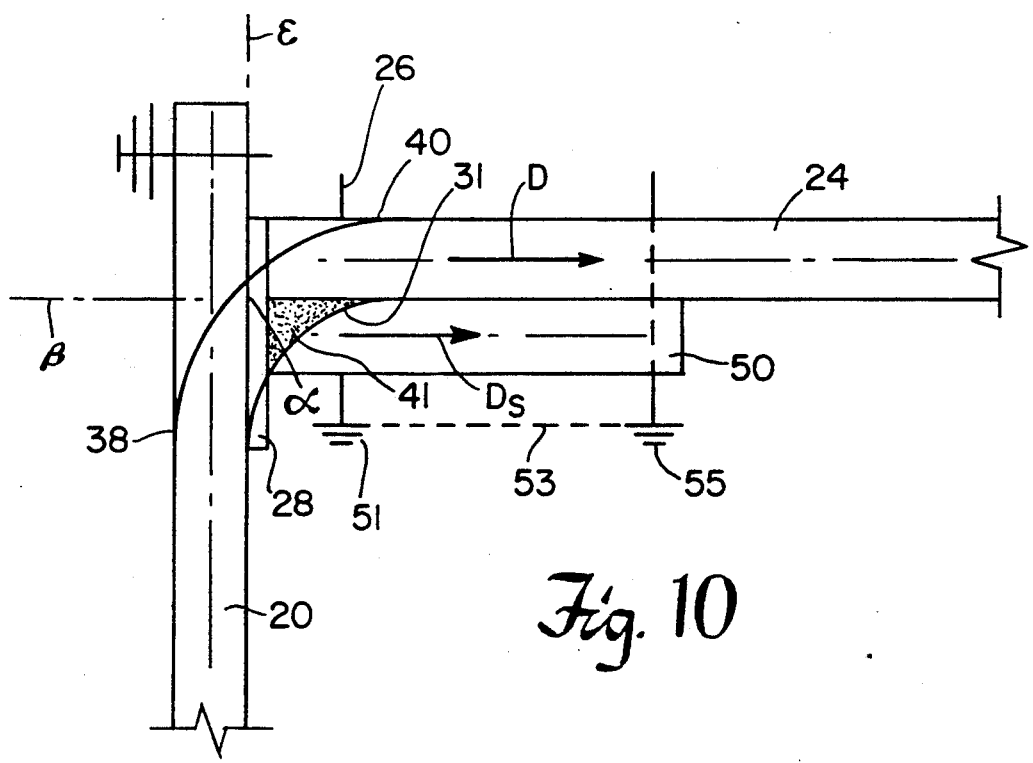
FIG. 10 is a view similar to FIG. 9 illustrating a second embodiment of the invention.

A second substantially triangular void 63 would be created similar to the void 41 in the FIG. 10 configuration, however a second supplemental conveyor chain 64 is located adjacent to the first supplemental conveyor 50 and acts in the same manner to engage articles A much earlier in their engagement time with the guide rail 30. Consequently, in the early stages of lateral movement induced by the guide rail 30, there is substantial lateral velocity imparted from the second supplemental chain 64 than by the first supplemental chain 50. Subsequently, while still in engagement with the guide rail 30, the article A is no longer in engagement with the input chain 20, but receives all of its discharge velocity component from the supplemental chain 50 and subsequently from chain 24.

Figure 12:
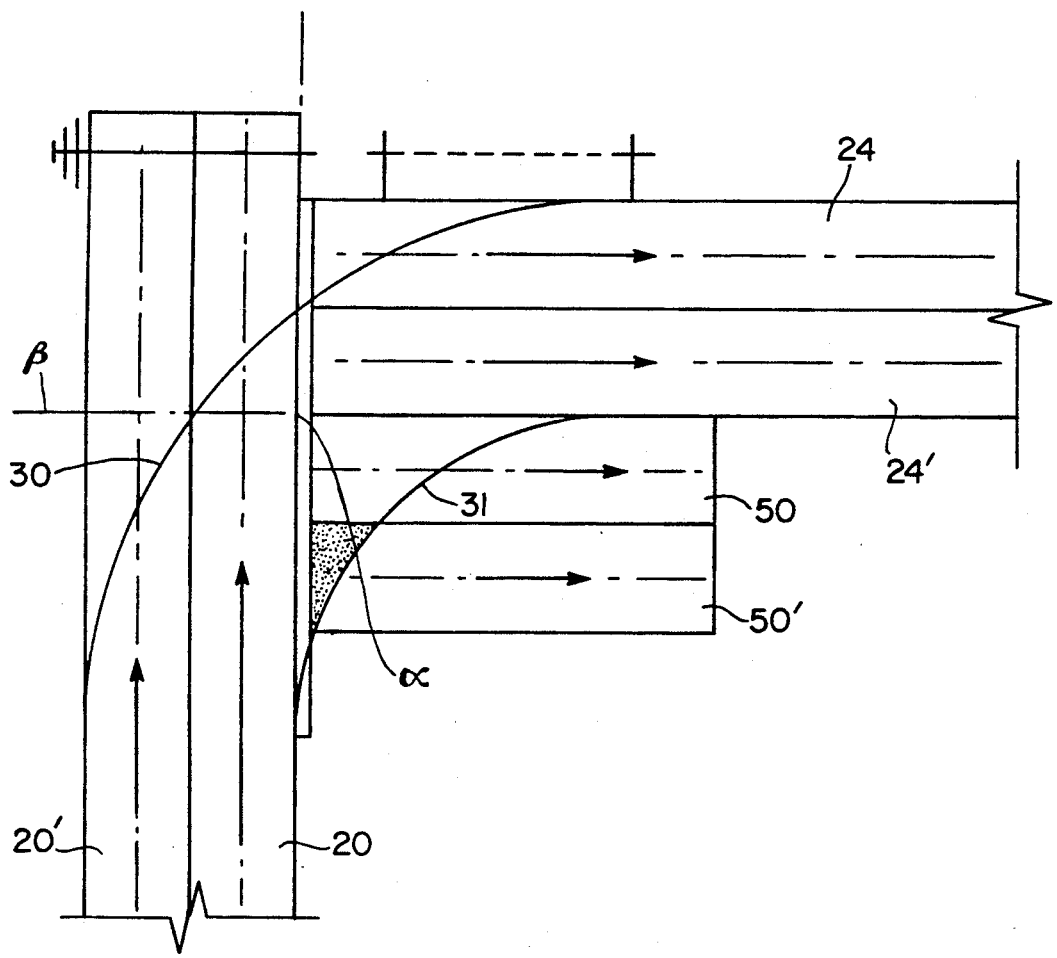
FIG. 12 is a view similar to FIG. 10 but showing conveyor chains of double width.

FIG. 12 illustrates the invention embodied in a conveyor system having double input chains 20 and 20' and double discharge chains 24 and 24'. In this instance, the guide rails also begin upstream from the line B and terminate downstream from the line $\epsilon$. Two supplemental discharge chains 50 and 50' are employed. The system operates in the same manner as described with reference to the FIGS. 9, 10 and 11 but can convey larger articles or more articles abreast of each other.

Figure 13:
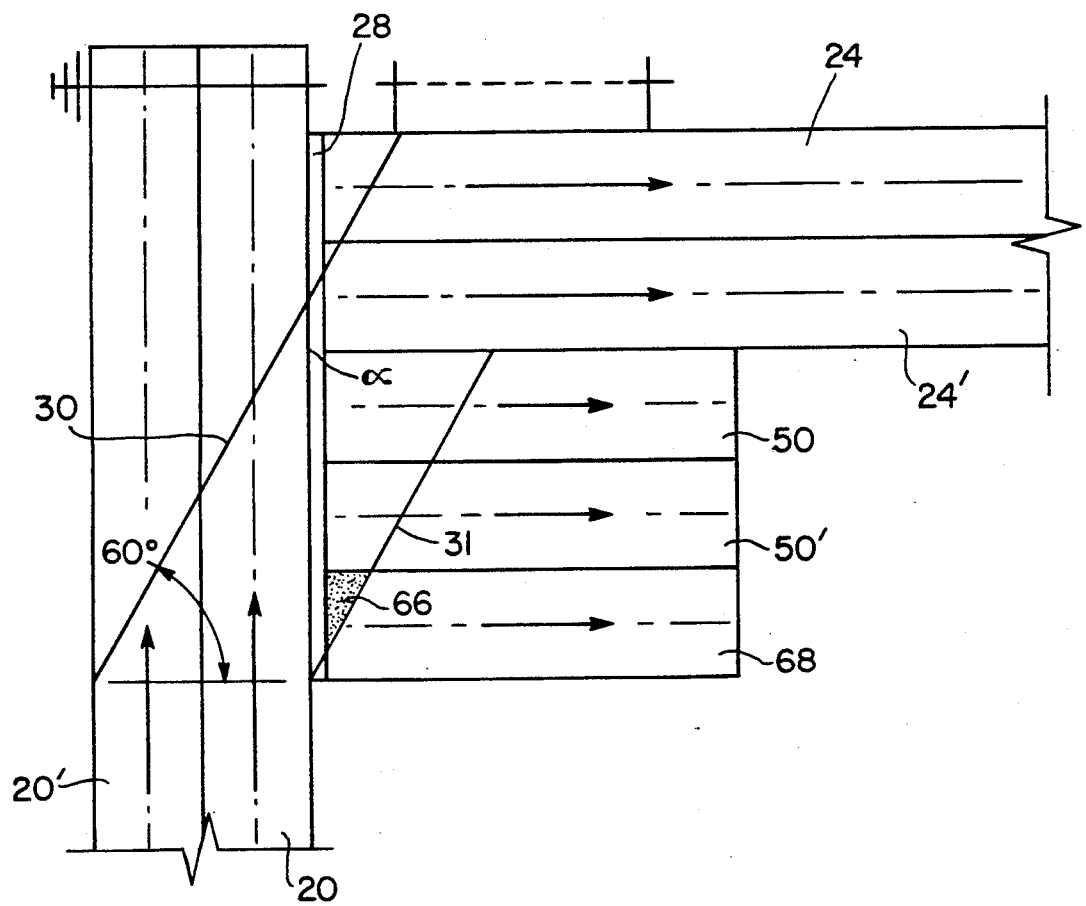
FIG. 13 is a view similar to FIG. 12 illustrating another embodiment of the invention.

FIG. 13 illustrates the invention embodied in a double input chain system having chains 20 and 20' and double discharge chains 24 and 24'. However, the guide rails 30' and 31' are straight as distinguished from being curved. It will be noted that a third void area 66 is created adjacent the dead plate 28. To eliminate problems in this area, a third supplemental discharge chain 68 is located parallel to the dishcarge chains 50 and 50'. With this construction, articles are given the lateral velocity discharge component still earlier in the turning cycle since engagement takes place with the guide rails still further upstream. The invention, however, operates in the same manner as hereinabove described.

I claim:

1. A conveyor having means for changing direction of conveyed articles comprising:
   an infeed chain and a discharge chain;
   the infeed chain extending transversely of the width of the discharge chain and intersecting the discharge chain at the apex of the reentrant angle defined as the intersecting inboard sides of each chain when the chains intersect at an angle;
   a guide rail extending from a point on the infeed chain which is upstream of the apex to a point on the discharge chain which is downstream of the apex, the articles being engagable with the chain as they move from the infeed chain to the discharge chain; and
   a supplemental discharge chain adjacent the discharge chain, movable parallel to and in the same direction as the discharge chain, to engage and impart motion to articles before they reach the discharge chain.

2. A conveyor in accordance with claim 1 having an interior guide rial extending from a point upstream on the infeed chain which is on the side of the chain opposite to the starting point of the first mentioned guide rail.

3. A conveyor in accordance with claim 1 wherein the guide rail is curvilinear.

4. A conveyor in accordance with claim 1 wherein the guide rail is linear.

5. A conveyor in accordance with claim 1 wherein there are a plurality of supplemental discharge chains movable parallel to and in the same direction as the discharge chain, each supplemental chain being successively engagable with an article being conveyed as it moves from the infeed chain to the discharge chain.

6. A conveyor in accordance with claim 1 where the supplemental discharge chain is driven through at least one jack shaft which derives power for the primary discharge chain.

7. A conveyor having means for changing direction of conveyed articles comprising:
   an infeed chain and a discharge chain;
   the infeed chain extending transversely of the width of the discharge chain and intersecting the discharge chain at the apex of the reentrant angle defined by as the intersecting inboard sides of each chain when the chains intersect at an angle;
   an exterior and an interior guide rail, each extending from a point on the infeed chain upstream of the apex, to a point on the discharge chain downstream of the apex to create a guidepath located above at least a portion of the reentrant angle; and
   at least one supplemental discharge chain adjacent the discharge chain, movable parallel to and in the same direction as the discharge chain, to engage and impart motion to articles before they reach the discharge chain.

8. A conveyor in accordance with claim 7 having an interior guide rail extending from a point upstream on the infeed chain which is on the side of the chain opposite to the starting point of the first mentioned guide rail.

9. A conveyor in accordance with claim 7 wherein the guide rail is curvilinear.

10. A conveyor in accordance with claim 7 wherein the guide rail is linear.

11. A conveyor in accordance with claim 7 wherein there are a plurality of supplemental discharge chains movable parallel to in the direction of the discharge chain, each supplemental chain being successively engagable with an article being conveyed as it moves from the infeed chain to the discharge chain.

12. A conveyor in accordance with claim 7 where the supplemental discharge chain is driven through at least one jack shaft which derives power for the primary discharge chain.

13. A conveyor having means for changing direction of conveyed articles comprising:
    an infeed chain and a discharge chain;
    the infeed chain extending transversely of the width of the discharge chain and intersecting the discharge chain at the apex of the reentrant angle defined as the intersecting inboard sides of each chain when the chains interest at an angle;
    an exterior and an interior guide rail, each extending from a point on the infeed chain upstream of the apex, to a point on the discharge chain downstream of the apex to create a guidepath located above at least a portion of the reentrant angle; and
    a plurality of supplemental discharge chains adjacent the first mentioned discharge chain, each movable parallel to and in the same direction as the first mentioned discharge chain, to successively engage and impart motion to articles before they reach the discharge chain.

14. A conveyor in accordance with claim 13 having an interior guide rail extending from a point upstream on the infeed chain which is on the side of the chain opposite to the starting point of the first mentioned guide rail.

15. A conveyor in accordance with claim 13 wherein the guide rail is curvilinear.

16. A conveyor in accordance with claim 13 wherein the guide rail is linear.

17. A conveyor in accordance with claim 13 where the supplemental discharge chain is driven through at least one jack shaft which derives power for the primary discharge chain.

* * * * *